United States Patent
Engelbrecht et al.

(10) Patent No.: US 7,686,877 B2
(45) Date of Patent: Mar. 30, 2010

(54) PIGMENTED TINTING CONCENTRATES COMPRISING A DIELS ALDER HUMECTANT

(75) Inventors: Lothar Alexander Engelbrecht, Heerenveen (NL); Roedolph Van Bohemen, Hoogeveen (NL); Frank Oliver Heinrich Pirrung, Binzen (DE)

(73) Assignee: Ciba Corporation, Tarrytown, NY (US)

( * ) Notice: Subject to any disclaimer, the term of this patent is extended or adjusted under 35 U.S.C. 154(b) by 236 days.

(21) Appl. No.: 11/919,896

(22) PCT Filed: May 8, 2006

(86) PCT No.: PCT/EP2006/062111
§ 371 (c)(1),
(2), (4) Date: Nov. 5, 2007

(87) PCT Pub. No.: WO2006/122890
PCT Pub. Date: Nov. 23, 2006

(65) Prior Publication Data
US 2009/0044721 A1    Feb. 19, 2009

(30) Foreign Application Priority Data
May 18, 2005    (EP) .................................. 05104157

(51) Int. Cl.
C09D 11/00    (2006.01)
C08K 5/00    (2006.01)
C08F 22/40    (2006.01)

(52) U.S. Cl. ...................... 106/31.6; 106/499; 523/160; 523/161; 526/262

(58) Field of Classification Search ....................... None
See application file for complete search history.

(56) References Cited

U.S. PATENT DOCUMENTS

| 2,449,956 A | 9/1948 | Shokal et al. ................ 560/231 |
| 4,775,729 A | 10/1988 | Defusco et al. .............. 526/262 |
| 5,952,402 A | 9/1999 | Paine et al. .................. 523/161 |
| 2001/0000253 A1 | 4/2001 | Matzinger ................... 523/160 |

*Primary Examiner*—Melvin C Mayes
*Assistant Examiner*—Sarah Van Oudenaren
(74) *Attorney, Agent, or Firm*—Joseph C. Suhadolnik

(57) ABSTRACT

The invention relates to pigmented tinting concentrates comprising a) stabilized pigments; b) humectant compounds obtainable by effecting a Diels Alder reaction at a temperature of 150-260° C. between a polyunsaturated compound and a co-reactant having the formula $R_1XOC-CH=CH-COXR_2$ or $CH_2=CH-COXR_3$ or $CH_2=CH(CH_3)-COXR_3$ wherein X is oxygen or $-NH-$ and wherein at least one of $R_1$ and $R_2$ is a polyether moiety and any other of $R_1$ and $R_2$ is a polyether moiety or hydrogen and $R_3$ is a polyether moiety.

6 Claims, No Drawings

PIGMENTED TINTING CONCENTRATES COMPRISING A DIELS ALDER HUMECTANT

The invention relates to humectants for aqueous based pigmented tinting concentrates.

Aqueous based pigmented tinting concentrates are used in a variety of industrial applications such as the manufacture of printing ink, paint, pulp and paper, coatings, and textiles to provide coloration.

Aqueous based pigmented tinting concentrates contain humectants to reduce or eliminate nozzle clogging due to drying at the front end of nozzles. However, humectants significantly reduce the drying rate of paints tinted with the pigment concentrates.

Current commercially available aqueous tinting concentrates contain ethylene glycol as humectant which performs well as a humectant in aqueous tinter concentrates, but it is moderately volatile having a vapour pressure substantially above 1.3 Pa at 25° C. Like all volatile organic liquids, ethylene glycol now attracts environmental disapproval.

Furthermore, ethylene glycol humectants have negative effects on gloss levels in humid atmosphere.

An object of the present invention is therefore to provide Volatile Organic Compound (VOC) free organic and inorganic pigmented tinting concentrates which have no negative effects on gloss levels.

It has been found that polyethers functionalized with Diels Alder reaction products provide a VOC-free humectants.

Thus, the invention relates to pigmented tinting concentrates comprising a) stabilized pigments;

b) humectant compounds obtainable by effecting a Diels Alder reaction at a temperature of 150-260° C. between a polyunsaturated compound and a co-reactant having the formula $R_1XOC-CH=CH-COXR_2$ or $CH_2=CH-COXR_3$ or $CH_2=CH(CH_3)-COXR_3$ wherein X is oxygen or —NH— and wherein at least one of $R_1$ and $R_2$ is a polyether moiety and any other of $R_1$ and $R_2$ is a polyether moiety or hydrogen and $R_3$ is a polyether moiety.

Compounds of the formula $R_1XOC-CH=CH-COXR_2$ may be prepared by opening maleic acid anhydride a hydroxy-functional polyether.

Polyunsaturated compounds are, for example, sorbic acid (2,4 hexadiene acid), β-Ionone (2,6,6, trimethylcyclohexenyl-buten-2-one), myrcene (7-methyl-3-methylen-1,6-octadien) or preferably polyunsaturated oils.

Polyunsaturated oils are preferably drying oils including, for example, tung oil, oiticica oil, de-hydrated castor oil, perilla oil, linseed oil, polymerized linseed oil soybean oil, sunflower oil, safflower oil, cotton seed oil, tall oil, fish oil and so forth as well as transesterificated oils obtained therefrom.

Transesterification is preferably carried out using a $C_1$-$C_{20}$alkyl alcohol, preferably methanol or a polyether or a polyether amine (jeffamine).

The drying oils from which the above adducts are derived contain fatty acids such as, e.g., 9,11,13 octadecatriene acid (eleostearic acid) or 4-oxo-9,11,13 octadecatriene acid (licanic acid, oiticica oil) or esters thereof.

Fatty acids having more than 2 double bonds are preferred. Thus, preferred are humectant compounds of the formula I

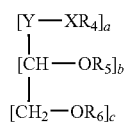

wherein a, b and c are each independently 0 or 1; with the proviso that a is 1 when b and c are 0;

Y is —$CH_2$—, when a, b and c are 1; and

Y is $C_1$-$C_{20}$alkyl or a polyether moiety when a is 1 and b and c are zero;

$R_4$ is

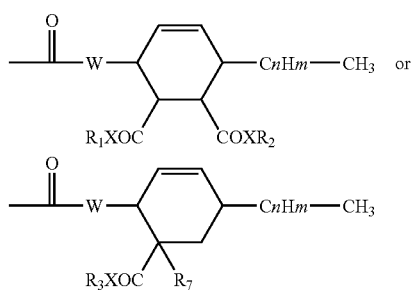

X is oxygen or —NH—;

$R_5$ and $R_6$ are hydrogen or $R_4$ or polyunsaturated fatty acid moieties;

at least one of $R_1$ and $R_2$ is a polyether moiety and any other of $R_1$ and $R_2$ is a polyether moiety or hydrogen;

$R_3$ is a polyether moiety, $R_7$ is hydrogen or methyl;

W —$(CH_2)_p$— or —$(CH_2)_{p'}$—CO—$(CH_2)_q$—;

n is 0 to 20, preferably 4 to 10;

m is (2n−2) to 2n;

p is 1 to 20, preferably 4 to 10;

p' is 1 to 20; preferably 2 to 4;

q is 1 to 20, preferably 4 to 10.

The term polyether moiety denotes a moiety derived from the transesterification of the polyunsaturated oil using a polyether or a polyether amine.

The term polyether denotes a macromolecule containing a plurality of ether groups and having a hydroxy end group, for example HO—$CH_2CH_2$—(O—$CH_2CH_2)_y$—OR or HO—$CH_2CH_2CH_2$—(O—$CH_2CH_2CH_2)_y$—OR or HO—$CH_2CH(CH_3)$—(O—$CH_2CH(CH_3))_y$—OR or mixed EO/PO-polyethers; wherein y is generally 0 to 22, preferably 3 to 22, most preferably 3 to 13, and R is alkyl, preferably $C_1$-$C_6$alkyl; most preferably methyl or ethyl.

The term polyether amine denotes a macromolecule containing a plurality of ether groups and having an amine end group, for example $H_2N$—$CH_2CH_2$—(O—$CH_2CH_2)_y$—OR or $H_2N$—$CH_2CH_2CH_2$—(O—$CH_2CH_2CH_2)_y$—OR or $H_2N-CH_2CH(CH_3)-(O-CH_2CH(CH_3))_y-OR$ or mixed EO/PO-polyether amines wherein y is generally 0 to 22, preferably 3 to 22, most preferably 3 to 13, and R is alkyl, preferably $C_1$-$C_6$alkyl; most preferably methyl or ethyl.

The pigment may be both organic and inorganic pigments such as phthalocyanines, azo-pigments, quinacridones or carbon blacks, titanium dioxides and iron oxides. The weight percentage of pigment in a tinter for example varies from 10 to 75 wt % depending on the strength of tinter required. Where a tinter is deliberately required to have a low strength (for example where only slightly off-white shades are wanted) there may be an insufficient number of pigment particles to enable the dispersing agent to generate enough structure. In such circumstances, it is usual to add extra neutral solid particles to the tinter and these neutral particles are often referred to as "extender" particles. For the purposes of this invention, any necessary extender particles will be considered to be pigment particles. Typical extenders include clays, chalks, talcs, barytes and silicas.

The pigment is stabilized using for example fatty acid modified emulsifiers such as, for example, EFKA 6225, EFKA 6220 or EFKA 6230 or dispersants such as EFKA 5071, EFKA 4550, EFKA 4570, EFKA 4580 and the like.

The humectants according to the invention are particularly suitable for the production of pigment concentrates. For this purpose, the compounds according to the invention are introduced into water, and the pigments to be dispersed are added with stirring. In addition, these pigment concentrates may contain binder vehicles and/or other adjuvant substances. These pigment concentrates can be incorporated in various binder vehicles, such as alkyd resins, polyester resins, acrylate resins, polyurethane resins or epoxy resins for example.

The humectants according to the invention are also suitable for the production of ink jet inks.

EXAMPLES

The invention is further illustrated by the following Examples.

General Procedure for Intermediates A and B:

Intermediate A:

1 part of caustic potash is dissolved in 15 parts of methanol. 75 parts of Oiticica oil is added. The mixture is vigorously stirred at ambient temperature for about 1 hour under nitrogen atmosphere. After a resting time of about 1 day the lower phase is discarded as chemical waste. The upper phase mainly consisting of the methyl esters of the corresponding fatty acids can be used in the succeeding experiments without additional purification.

In the same way intermediate B based on tung oil was synthesized.

General Procedure for Humectant Syntheses [I]:

Maleic acid anhydride and a hydroxy-functional polyether were placed in a three-necked flask under nitrogen atmosphere and heated to 120° C. At this temperature an unsaturated raw material (reactive as a diene in terms of a Diels-Alder reaction) was added. The reaction mixture was heated up to 180-190° C. for about 5 h. For detailed mol ratios see Table 1.

General Procedure for Humectant Syntheses [II]:

A mixture of an unsaturated raw material (reactive as a diene in terms of a Diels-Alder reaction) and a (meth)acrylic-functional polyether was placed in a three-necked flask under nitrogen atmosphere and heated to 180-190° C. for about 5 h. For detailed mol ratios see Table 2.

General Procedure for Humectant Syntheses [III]:

A mixture of intermediate A (B resp.), a mono-OH functional polyether and 0.5 weight-% of p-toluenesulfonic acid was placed in a three-necked flask under nitrogen atmosphere and heated to 180-190° C. for about 5 h. After cooling to 120° C. maleic anhydride is added. This mixture is heated to 180-190° C. for about 3 h more. For detailed mol ratios see Table 3.

The obtained products showed an excellent performance as humectants. The performance could be enhanced by addition of siccatives and/or ionization of the acidic groups. Fatty acid amine condensates were in particular suitable as ionizing agents.

Legend to chemical composition of used raw materials:

PEG-200: Polyethylene glycol; $M_w$~200 g/mol

PEG-600: Polyethylene glycol; $M_w$~600 g/mol

MPPG-200 Polypropylene glycol monomethyl ether; $M_w$~200 g/mol

MPEG-350: Polyethylene glycol monomethyl ether; $M_w$~350 g/mol

MPEG-500: Polyethylene glycol monomethyl ether; $M_w$~500 g/mol

MPEG-750: Polyethylene glycol monomethyl ether; $M_w$~750 g/mol

MPEG-1000: Polyethylene glycol monomethyl ether; $M_w$~1000 g/mol

PLURAFAC LF 401: Nonionic surfactants from BASF

PLURAFAC LF 600: Nonionic surfactants from BASF

BISOMER MPEG 350 MA: Monomethyl polyethylene glycol methacrylic ester;
    Average mol weight: 350 g/mol BISOMER MPEG 550 MA: Monomethyl polyethylene glycol methacrylic ester;
    Average mol weight: 550 g/mol BISOMER MPEG 1000 MA: Monomethyl polyethylene glycol methacrylic ester;
    Average mol weight: 1000 g/mol Mn siccative: Nuodex WEB Manganese 9 from Elementis Ce siccative: Valirex Ce 10% D60

Co siccative: Cobalt naphthenate from Aldrich

Ionizing agent: Fatty acid amine condensates and similar compounds.

TAB. 1

General procedure for humectant syntheses I

| Example | maleic anhydride | Polyether | Polyunsaturated compound |
|---|---|---|---|
| 1 | 7.5 g | 15.0 g PEG-200 | 37.5 g tung oil |
| 2 | 7.5 g | 26.3 g MPEG-350 | 37.5 g tung oil |
| 3 | 7.5 g | 37.5 g MPEG-500 | 37.5 g tung oil |
| 4 | 7.5 g | 15.0 g PEG-200 | 37.5 g oiticica oil |
| 5 | 7.5 g | 26.3 g MPEG-350 | 37.5 g oiticica oil |
| 6 | 7.5 g | 37.5 g MPEG-500 | 37.5 g oiticica oil |
| 7 | 7.5 g | 18.4 g MPEG-500 | 37.5 g tung oil |
| 8 | 7.5 g | 37.5 g MPEG-500 | 39.4 g intermediate B |

TAB. 1-continued

General procedure for humectant syntheses I

| Example | maleic anhydride | Polyether | Polyunsaturated compound |
|---|---|---|---|
| 9 | 7.5 g | 37.5 g MPEG-500 | 39.4 g intermediate A |
| 10 | 7.5 g | 37.5 g MPEG-500 | 23.3 g intermediate B |
| 11 | 7.5 g | 37.5 g MPEG-500 | 23.3 g intermediate A |
| 12 | 7.5 g | 46.7 g Plurafac LF 401 | 37.5 g tung oil |
| 13 | 7.5 g | 46.7 g Plurafac LF 401 | 37.5 g oiticica oil |
| 14 | 7.5 g | 29.9 g Plurafac LF 600 | 37.5 g oiticica oil |
| 15 | 10.0 g | 20.0 g PEG-200 | 31.2 g intermediate A |
| 16 | 10.0 g | 20.0 g PEG-200 | 31.2 g intermediate B |
| 17 | 2.5 g | 24.0 g Plurafac LF 600 | 39.4 g intermediate A |
| 18 | 2.5 g | 37.5 g Plurafac LF 401 | 7.3 g intermediate B |
| 19 | 3.0 g | 18.4 g PEG-600 | 30.0 g tung oil |
| 20 | 3.0 g | 18.4 g PEG-600 | 30.0 g oiticica oil |
| 21 | 2.7 g | 27.5 g MPEG-1000 | 40.5 g tung oil |
| 22 | 2.7 g | 27.5 g MPEG-1000 | 40.5 g oiticica oil |
| 23 | 7.5 g | 26.3 g MPEG-350 | 23.3 g intermediate A |
| 24 | 7.5 g | 26.3 g MPEG-350 | 23.3 g intermediate B |
| 25 | 7.5 g | 75.0 g MPEG-1000 | 23.3 g intermediate B |
| 26 | 7.5 g | 75.0 g MPEG-1000 | 23.3 g intermediate A |
| 27 | 7.5 g | 56.3 g MPEG-750 | 23.3 g intermediate B |
| 28 | 7.5 g | 56.3 g MPEG-750 | 23.3 g intermediate A |

TAB. 2

General procedure for humectant syntheses II

| Example | (Meth)acrylic-functional polyether | Polyunsaturated compound |
|---|---|---|
| 29 | 42.10 g Bisomer MPEG 500 MA | 37.5 g tung oil |
| 30 | 42.10 g Bisomer MPEG 500 MA | 37.5 g oiticica oil |
| 31 | 22.8 g Bisomer MPEG 1000 MA | 37.5 g tung oil |
| 32 | 22.8 g Bisomer MPEG 1000 MA | 37.5 g oiticica oil |
| 33 | 34.3 g Bisomer MPEG 550 MA | 5.9 g sorbic acid |
| 34 | 34.3 g Bisomer MPEG 550 MA | 10.1 g β-Ionone |
| 35 | 34.3 g Bisomer MPEG 550 MA | 7.3 g myrcene |
| 36 | 34.0 g Bisomer MPEG 350 MA | 25.0 g tung oil |
| 37 | 30.0 g Bisomer MPEG 1000 MA | 8.5 g intermediate A |
| 38 | 30.0 g Bisomer MPEG 1000 MA | 8.5 g intermediate B |
| 39 | 45.10 g Bisomer MPEG 550 MA | 25.0 g intermediate A |
| 40 | 45.10 g Bisomer MPEG 550 MA | 25.0 g intermediate B |
| 41 | 34.0 g Bisomer MPEG 350 MA | 25.0 g oiticica oil |

Sorbic acid = 2,4 hexadiene acid
β-Ionone = 2,6,6, trimethylcyclohexenyl-buten-2-one.
Myrcene = 7-methyl-3-methylen-1,6-octadien.

TAB. 3

General procedure for humectant syntheses III

| Ex. | maleic anhydride | Polyether | Polyunsaturated compound | Siccative | Ion. agent |
|---|---|---|---|---|---|
| 42 | 1.4 g | 42.0 g MPEG-500 | 21.0 g intermediate B | | |
| 43 | 2.8 g | 42.0 g MPEG-500 | 21.0 g intermediate B | | |
| 44 | 4.2 g | 42.0 g MPEG-500 | 21.0 g intermediate B | | |
| 45 | 1.4 g | 42.0 g MPEG-500 | 21.0 g intermediate A | | |
| 46 | 2.8 g | 42.0 g MPEG-500 | 21.0 g intermediate A | | |
| 47 | 4.2 g | 42.0 g MPEG-500 | 21.0 g intermediate A | | |
| 48 | 1.4 g | 29.0 g MPEG-350 | 21.0 g intermediate B | | |
| 49 | 2.8 g | 29.0 g MPEG-350 | 21.0 g intermediate B | | |
| 50 | 4.2 g | 29.0 g MPEG-350 | 21.0 g intermediate B | | |
| 51 | 1.4 g | 29.0 g MPEG-350 | 21.0 g intermediate A | | |
| 52 | 2.8 g | 29.0 g MPEG-350 | 21.0 g intermediate A | | |
| 53 | 4.2 g | 29.0 g MPEG-350 | 21.0 g intermediate A | | |
| 54 | 1.4 g | 42.0 g MPEG-500 | 21.0 g intermediate B | | 3.24 g |
| 55 | 1.4 g | 29.0 g MPEG-350 | 21.0 g intermediate A | | 3.24 g |
| 56 | 1.4 g | 42.0 g MPEG-500 | 21.0 g intermediate B | 11.3 g Co sicc. | |
| 57 | 1.4 g | 42.0 g MPEG-500 | 21.0 g intermediate A | 11.3 g Co sicc. | |
| 58 | 1.4 g | 42.0 g MPEG-500 | 21.0 g intermediate B | 11.3 g Co sicc. | 3.24 g |
| 59 | 1.4 g | 42.0 g MPEG-500 | 21.0 g intermediate A | 11.3 g Co sicc. | 3.24 g |
| 60 | 1.4 g | 42.0 g MPEG-500 | 21.0 g intermediate B | 6.7 g Ce sicc. | |
| 61 | 1.4 g | 42.0 g MPEG-500 | 21.0 g intermediate A | 6.7 g Ce sicc. | |
| 62 | 1.4 g | 42.0 g MPEG-500 | 21.0 g intermediate B | 6.7 g Ce sicc. | 3.24 g |
| 63 | 1.4 g | 42.0 g MPEG-500 | 21.0 g intermediate A | 6.7 g Ce sicc. | 3.24 g |
| 64 | 1.4 g | 42.0 g MPEG-500 | 21.0 g intermediate B | 7.4 g Mn sicc. | |
| 65 | 1.4 g | 42.0 g MPEG-500 | 21.0 g intermediate A | 7.4 g Mn sicc. | |
| 66 | 1.4 g | 42.0 g MPEG-500 | 21.0 g intermediate B | 7.4 g Mn sicc. | 3.24 g |
| 67 | 1.4 g | 42.0 g MPEG-500 | 21.0 g intermediate A | 7.4 g Mn sicc. | 3.24 g |
| 68 | 1.4 g | 29.0 g MPEG-350 | 21.0 g intermediate B | 9.0 g Co sicc. | |
| 69 | 1.4 g | 29.0 g MPEG-350 | 21.0 g intermediate A | 9.0 g Co sicc. | |
| 70 | 1.4 g | 29.0 g MPEG-350 | 21.0 g intermediate B | 9.0 g Co sicc. | 3.24 g |
| 71 | 1.4 g | 29.0 g MPEG-350 | 21.0 g intermediate A | 9.0 g Co sicc. | 3.24 g |
| 72 | 1.4 g | 29.0 g MPEG-350 | 21.0 g intermediate B | 5.3 g Ce sicc. | |
| 73 | 1.4 g | 29.0 g MPEG-350 | 21.0 g intermediate A | 5.3 g Ce sicc. | |
| 74 | 1.4 g | 29.0 g MPEG-350 | 21.0 g intermediate B | 5.3 g Ce sicc. | 3.24 g |
| 75 | 1.4 g | 29.0 g MPEG-350 | 21.0 g intermediate A | 5.3 g Ce sicc. | 3.24 g |
| 76 | 1.4 g | 29.0 g MPEG-350 | 21.0 g intermediate B | 5.9 g Mn sicc. | |
| 77 | 1.4 g | 29.0 g MPEG-350 | 21.0 g intermediate A | 5.9 g Mn sicc. | |
| 78 | 1.4 g | 29.0 g MPEG-350 | 21.0 g intermediate B | 5.9 g Mn sicc. | 3.24 g |
| 79 | 1.4 g | 29.0 g MPEG-350 | 21.0 g intermediate A | 5.9 g Mn sicc. | 3.24 g |
| 80 | 7.5 g | 15.5 g MPPG 200 | 23.3 g intermediate A | | |
| 81 | 7.5 g | 15.5 g MPPG 200 | 23.3 g intermediate B | | |

Preparation of Pigmented Tinting Concentrates:

The pigment concentrates based on a universal colourant guide formulation (see comparative Example 2).

The ratio between solid carrier (humectant), pigment and dispersant is equal to the guide formulation.

Additional demi-water was used to bring the concentrates on the right grinding-viscosity and ground them for 1 hour with glass beads in a Scandex (paint shaker).

The commercial products "Nuosperse 2000" and "Humectant GRB2" were used in the comparative examples 3 and 4 as reference aside from a pure Long Oil Alkyd [concentrate] (see comparative example 1) which is "the ideal standard", and comparative example 2 as the existing guide-formulation for this application.

|  | Comp. Example 1 | Comp. Example 2 | Comp. Example 3 | Comp. Example 4 |
|---|---|---|---|---|
| Nuosperse 2000 [70% in water] | — | — | 20.94 | — |
| Humectant GRB2 | — | — | — | 18.0 |
| L.O. Alkyd Transparent | 26.75 | — | — | — |
| Poly ethylene glycol 200 | — | 8.49 | — | — |
| Tri propylene glycol methyl ether | — | 8.49 | — | — |
| EFKA-6225 | 6.50 | 6.13 | 5.52 | 6.50 |
| NaOH 25% | — | 0.94 | 0.85 | 1.00 |
| Dem. water | — | 37.74 | 38.30 | 34.00 |
| Shellsol D40 | 26.75 | — | — | — |
| PY 74 Monoazo pigment | 40.00 | 37.74 | 33.97 | 40.00 |
| Defoamer | — | 0.28 | 0.25 | 0.30 |
| Preservative | — | 0.19 | 0.17 | 0.20 |
|  | 100.00 | 100.00 | 100.00 | 100.00 |

Humidity Test with these Concentrates:

The concentrates were mixed out in Long Oil Alkyd transparent let down:

| | |
|---|---|
| Long Oil Alkyd 70 solid | 81.7 |
| White spirit | 14.6 |
| Ca 10% dryer | 1.2 |
| Co 10% dryer | 0.4 |
| Zr 18% dryer | 1.7 |
| Anti skinning agent | 0.4 |

Addition of PY 74—concentrates was calculated on 4 g dry pigment into 100 g of L.O. Alkyd transparent.

By using this calculation the amount of carrier and dispersant etc. was the same between all the mixtures, only the amount of water was different.

PY 42—concentrates were mixed out based on 10 g of dry pigment on 100 g of L.O. Alkyd transparent paint.

PV 23—concentrates were mixed out based on 1.3 g of dry pigment on 100 g of L.O. Alkyd transparent paint.

The mixtures were stirred-in by hand and draw-downs were made with a 75 micron wire-bar on polyester foil and placed direct after application (wet) in a humidity cabinet on 40° C. for drying during one night.

After drying the gloss (600) was measured.

Test Results:

| Examples | Pigment | % Pigment in concentrate | Gloss after humidity |
|---|---|---|---|
| Comparative Ex. 1 | PY 74 | 40.00 | 86.1 |
| Comparative Ex. 2 | PY 74 | 37.74 | 14.0 |
| Comparative Ex. 3 | PY 74 | 33.97 | 61.5 |
| Comparative Ex. 4 | PY 74 | 40.00 | 13.0 |
| Example 1 | PY 74 | 31.07 | 27.3 |
| Example 2 | PY 74 | 28.75 | 83.4 |
| Example 3 | PY 74 | 33.33 | 86.8 |
| Example 4 | PY 74 | 32.00 | 18.6 |
| Example 5 | PY 74 | 29.08 | 80.7 |
| Example 6 | PY 74 | 33.18 | 81.5 |
| Example 7 | PY 74 | 30.08 | 80.5 |
| Example 8 | PY 74 | 36.77 | 64.6 |
| Example 9 | PY 74 | 35.37 | 61.8 |
| Example 10 | PY 74 | 36.37 | 62.5 |
| Example 11 | PY 74 | 37.77 | 63.2 |
| Example 12 | PY 74 | 25.81 | 68.9 |
| Example 13 | PY 74 | 26.73 | 66.2 |
| Example 14 | PY 74 | 25.73 | 67.2 |
| Example 15 | PY 74 | 32.50 | 81.2 |
| Example 16 | PY 74 | 32.00 | 82.2 |
| Example 17 | PY-74 | 27.77 | 67.7 |
| Example 18 | PY-74 | 28.57 | 68.2 |
| Example 33 | PY 74 | 32.00 | 65.9 |
| Example 34 | PY 74 | 32.00 | 67.8 |
| Example 35 | PY 74 | 32.00 | 66.3 |
| Example 39 | PY 74 | 36.1 | 83.6 |
| Example 40 | PY 74 | 36.37 | 83.0 |
| Example 40a | PY 42 | 50.75 | 85.7 |
| Example 40b | PV 23 | 10 + 15 | 83.1 |
| Example 42 | PV 23 | 10 + 15 | 80.3 |
| Example 43 | PV 23 | 10 + 15 | 79.8 |
| Example 44 | PV 23 | 10 + 15 | 78.3 |
| Example 45 | PV 23 | 10 + 15 | 78.1 |
| Example 46 | PV 23 | 10 + 15 | 79.2 |
| Example 47 | PV 23 | 10 + 15 | 76.3 |
| Example 48 | PV 23 | 10 + 15 | 68.3 |
| Example 49 | PV 23 | 10 + 15 | 84.2 |
| Example 50 | PV 23 | 10 + 15 | 79.0 |
| Example 51 | PV 23 | 10 + 15 | 67.1 |
| Example 52 | PV 23 | 10 + 15 | 84.4 |
| Example 53 | PV 23 | 10 + 15 | 81.0 |
| Example 54 | PV 23 | 10 + 15 | |
| Example 55 | PV 23 | 10 + 15 | |
| Example 56 | PV 23 | 10 + 15 | 3.4 |
| Example 57 | PV 23 | 10 + 15 | 3.0 |
| Example 58 | PV 23 | 10 + 15 | 2.6 |
| Example 60 | PV23 | 10 + 15 | 86.2 |
| Example 62 | PV23 | 10 + 15 | 87.3 |
| Example 64 | PV23 | 10 + 15 | 90.4 |
| Example 66 | PV23 | 10 + 15 | 88.7 |

Humidity test results confirm that paint films based on the humectant of the invention show a high gloss of the cured film compared to polyethylene glycol humectants (comparative Ex. 2 and 4).
PY 74: monoazo from Ciba or Clariant
PV23: Dioxazine from Ciba or Clariant
Note: Pigment % = 10% PV23 + 15% china clay from Engelhard
PY42: Yellow-oxide from Bayer.
Nuosperse 2000 from Elementis
Humectant GRB2 from Avecia
Shellsol D40 from Shell,
EFKA-6225 from EFKA Additives B.V.

The invention claimed is:

1. Pigmented tinting concentrates comprising
   a) stabilized pigments;
   b) humectant compounds obtained by effecting a Diels Alder reaction at a temperature of 150-260° C. between a polyunsaturated compound and a co-reactant having the formula $R_1XOC—CH=CH—COXR_2$ or $CH_2=CH—COXR_3$ or $CH_2CH(CH_3)—COXR_3$ wherein X is oxygen or —NH— and wherein at least one of $R_1$ and $R_2$ is a polyether moiety and any other of $R_1$ and $R_2$ is a polyether moiety or hydrogen and $R_3$ is a polyether moiety
wherein the humectant compound is a compound of the formula I

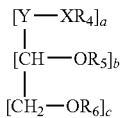

wherein
a, b and c are each independently 0 or 1; with the proviso that a is 1 when b and c are 0;
Y is $-CH_2-$, when a, b and c are 1; and
Y is $C_1$-$C_{20}$alkyl or a polyether moiety when a is 1 and b and c are zero;
$R_4$ is

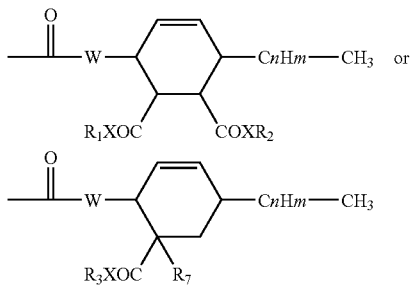

X is oxygen or $-NH-$;
$R_5$ and $R_6$ are hydrogen or $R_4$ or polyunsaturated fatty acid moieties;
at least one of $R_1$ and $R_2$ is a polyether moiety and any other of $R_1$ and $R_2$ is a polyether moiety or hydrogen;
$R_3$ is a polyether moiety,
$R_7$ is hydrogen or methyl;
$W-(CH_2)_p-$ or $-(CH_2)_{p'}-CO-(CH_2)_q-$;
n is 0 to 20;
m is (2n-2) to 2n;
p is 1 to 20;
p' is 1 to 20;
q is 1 to 20.

2. Pigmented tinting concentrates according to claim 1, wherein
n is 4 to 10;
p is 4 to 10
p' is 2 to 4; and
q is 4 to 10.

3. An ink jet ink comprising as humectant a compound of the formula I

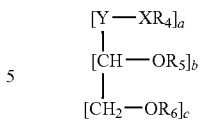

wherein
a, b and c are each independently 0 or 1; with the proviso that a is 1 when b and c are 0;
Y is $-CH_2-$, when a, b and c are 1; and
Y is $C_1$-$C_{20}$alkyl or a polyether moiety when a is 1 and b and c are zero;
$R_4$ is

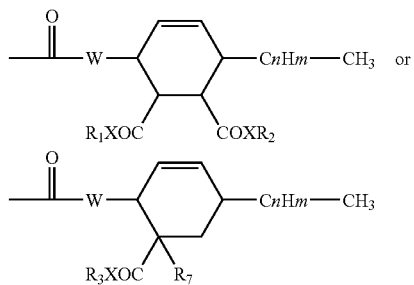

X is oxygen or $-NH-$;
$R_5$ and $R_6$ are hydrogen or $R_4$ or polyunsaturated fatty acid moieties;
at least one of $R_1$ and $R_2$ is a polyether moiety and any other of $R_1$ and $R_2$ is a polyether moiety or hydrogen;
$R_3$ is a polyether moiety,
$R_7$ is hydrogen or methyl;
$W-(CH_2)_p-$ or $(CH_2)_{p'}-CO-(CH_2)_q-$;
n is 0 to 20;
m is (2n-2) to 2n;
p is 1 to 20;
p' is 1 to 20; and
q is 1 to 20.

4. Pigmented tinting concentrates according to claim 1, wherein the polyunsaturated compound is sorbic acid (2,4 hexadiene acid), β-Ionone (2,6,6, trimethylcyclohexenyl-buten-2-one) or myrcene (7-methyl-3-methylen-1,6-octadien).

5. Pigmented tinting concentrates according to claim 1, wherein the polyunsaturated compound is a polyunsaturated oil or a transesterificated oil obtained therefrom.

6. Pigmented tinting concentrates according to claim 5, wherein the polyunsaturated oil is tung oil or oiticica oil or transesterificated tung oil or oiticica oil.

* * * * *